United States Patent
Okubo

(10) Patent No.: US 10,810,757 B2
(45) Date of Patent: Oct. 20, 2020

(54) VEHICLE EXTERIOR ENVIRONMENT RECOGNITION APPARATUS

(71) Applicant: SUBARU CORPORATION, Tokyo (JP)

(72) Inventor: Toshimi Okubo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 135 days.

(21) Appl. No.: 16/178,462

(22) Filed: Nov. 1, 2018

(65) Prior Publication Data

US 2019/0197720 A1 Jun. 27, 2019

(30) Foreign Application Priority Data

Dec. 25, 2017 (JP) .................................. 2017-248484

(51) Int. Cl.
*G06T 7/70* (2017.01)
*G06K 9/00* (2006.01)
*G06K 9/46* (2006.01)

(52) U.S. Cl.
CPC ............ *G06T 7/70* (2017.01); *G06K 9/00201* (2013.01); *G06K 9/00805* (2013.01);
(Continued)

(58) Field of Classification Search
CPC ................... G06T 7/70; G06T 2200/04; G06T 2207/30261; G06K 9/00201; G06K 9/00805; G06K 9/4633
See application file for complete search history.

(56) References Cited

U.S. PATENT DOCUMENTS

2012/0207348 A1   8/2012  Saito
2018/0137339 A1*  5/2018  Osato ...................... B60R 21/00
2019/0001910 A1*  1/2019  Motohashi .............. B60R 21/02

FOREIGN PATENT DOCUMENTS

JP     2001-052171 A      2/2001
JP         3349060 B2     11/2002
(Continued)

OTHER PUBLICATIONS

Japanese Notice of Reasons for Refusal issued in corresponding Japanese Patent Application No. 2017-248484, dated Oct. 29, 2019, with English translation.

*Primary Examiner* — Menatoallah Youssef
(74) *Attorney, Agent, or Firm* — McDermott Will & Emery LLP

(57) ABSTRACT

A vehicle exterior environment recognition apparatus includes a road surface identifying unit, a three-dimensional object identifying unit, a road surface determining unit, and a three-dimensional object composition unit. The road surface identifying unit identifies a road surface in an image. The three-dimensional object identifying unit identifies three-dimensional objects each having a height extending vertically upward from the identified road surface. When the identified three-dimensional objects are separated and are located at respective positions distant from an own vehicle by a same relative distance, the road surface determining unit performs a determination of whether a three-dimensional-object-intervening region between the identified three-dimensional objects has a correspondence to the road surface. When the three-dimensional-object-intervening region is determined to have no correspondence to the road surface, the three-dimensional object composition unit regards the identified three-dimensional objects separated from each other as candidate parts of a unified three-dimensional object.

4 Claims, 9 Drawing Sheets

(52) U.S. Cl.
CPC ........ *G06K 9/4633* (2013.01); *G06T 2200/04* (2013.01); *G06T 2207/30261* (2013.01)

(56) References Cited

FOREIGN PATENT DOCUMENTS

| | | |
|---|---|---|
| JP | 2012-168838 A | 9/2012 |
| JP | 2017-016331 A | 1/2017 |
| WO | 2017/154389 A1 | 9/2017 |

\* cited by examiner

VEHICLE EXTERIOR ENVIRONMENT RECOGNITION APPARATUS

CROSS-REFERENCE TO RELATED APPLICATIONS

The present application claims priority from Japanese Patent Application No. 2017-248484 filed on Dec. 25, 2017, the entire contents of which are hereby incorporated by reference.

BACKGROUND

The technology relates to a vehicle exterior environment recognition apparatus that identifies a specific object present in a traveling direction of an own vehicle.

A technique has been proposed which detects a three-dimensional object, such as a preceding vehicle located ahead of an own vehicle, to perform control that avoids contact with the preceding vehicle (i.e., contact avoidance control) or to perform control that keeps a predetermined inter-vehicular distance from the own vehicle to the preceding vehicle (i.e., cruise control). For example, reference is made to Japanese Patent No. 3349060.

SUMMARY

An aspect of the technology provides a vehicle exterior environment recognition apparatus configured to recognize an environment outside an own vehicle. The apparatus includes: a road surface identifying unit configured to identify a road surface in an image; a three-dimensional object identifying unit configured to identify three-dimensional objects each having a height extending vertically upward from the identified road surface; a road surface determining unit configured to perform a determination of whether a three-dimensional-object-intervening region between the three-dimensional objects identified by the three-dimensional object identifying unit has a correspondence to the road surface, when the identified three-dimensional objects are separated from each other and are located at respective positions distant from the own vehicle by a same relative distance; and a three-dimensional object composition unit configured to regard the identified three-dimensional objects that are separated from each other as candidate parts of a unified three-dimensional object, when the three-dimensional-object-intervening region is determined to have no correspondence to the road surface by the road surface determining unit.

An aspect of the technology provides a vehicle exterior environment recognition apparatus configured to recognize an environment outside an own vehicle. The apparatus includes circuitry configured to identify a road surface in an image, identify three-dimensional objects each having a height extending vertically upward from the identified road surface, perform a determination of whether a three-dimensional-object-intervening region between the identified three-dimensional objects has a correspondence to the road surface, when the identified three-dimensional objects are separated from each other and are located at respective positions distant from the own vehicle by a same relative, and regard the identified three-dimensional objects that are separated from each other as candidate parts of a unified three-dimensional object, when the three-dimensional-object-intervening region is determined to have no correspondence to the road surface.

BRIEF DESCRIPTION OF THE DRAWINGS

The accompanying drawings are included to provide a further understanding of the technology and are incorporated in and constitute a part of this specification. The drawings illustrate example implementations and, together with the specification, serve to explain the principles of the technology.

DETAILED DESCRIPTION

Figure 1:
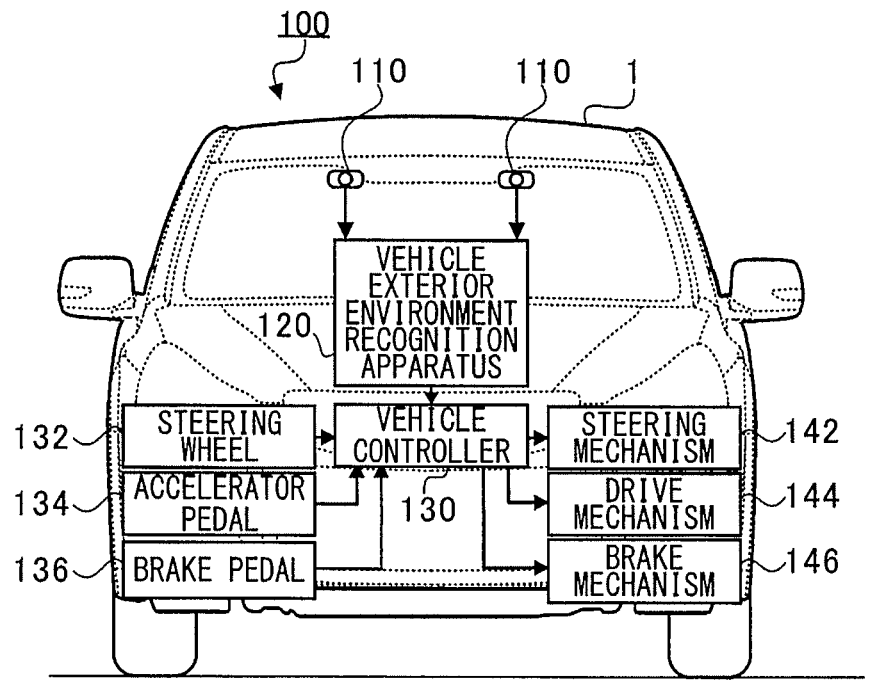
FIG. 1 is a block diagram illustrating an example relation of connection in a vehicle exterior environment recognition system according to one implementation of the technology.

In the following, some implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated. Further, elements in the following example implementations which are not recited in a most-generic independent claim of the technology are optional and may be provided on an as-needed basis. Throughout the present specification and the drawings, elements having substantially the same function and configuration are denoted with the same reference numerals to avoid any redundant description. Further, elements that are not directly related to the technology are unillustrated in the drawings. The drawings are schematic and are not intended to be drawn to scale.

Examples of a three-dimensional object present in a traveling direction of an own vehicle may include a preceding vehicle traveling in the same direction as the own vehicle and a pedestrian moving in a lateral direction across the traveling path of the own vehicle. For example, grouping may be performed of a plurality of blocks that are located at respective positions distant from the own vehicle by the same relative distance in a captured image of an environment ahead of the own vehicle. When the external appearance of a three-dimensional object represented by the resultant group has a feature corresponding to a rear surface of a vehicle, the three-dimensional object may be identified as a preceding vehicle.

However, in a case where a relative distance from the own vehicle to a middle portion of the rear surface of the preceding vehicle is difficult to be obtained due to a factor, such as backlight, and only a relative distance from the own vehicle to two opposite side portions of the preceding vehicle that are separated from each other is obtained, the two opposite side portions that should be identified as a unified preceding vehicle can be misidentified as two different three-dimensional objects that are separated from each other.

One possible measure to identify the two opposite side portions separated from each other as a unified object may include relaxation of a threshold range of relative distance or a threshold for identification of a unified object. However, such simple relaxation of the threshold value can cause misidentification, as a unified three-dimensional object, of three-dimensional objects, such as road cones, that are separated from each other and aligned at respective positions distant from the own vehicle by the same relative distance. This can cause an excess contact avoidance control. In such a case, only the presence of an additional three-dimensional object disposed between the two different three-dimensional objects may help to prevent or inhibit the misidentification of these three-dimensional objects as a unified three-dimensional object. However, in a case of no additional three-dimensional object presents between two three-dimensional objects, it is difficult to properly extract a three-dimensional object that should be identified as a unified preceding vehicle.

It is desirable to provide a vehicle exterior environment recognition apparatus that achieves proper extraction of a three-dimensional object.

[Vehicle Exterior Environment Recognition System 100]

FIG. 1 is a block diagram illustrating an example relation of connection in a vehicle exterior environment recognition system 100 according to an example implementation of the technology. The vehicle exterior environment recognition system 100 may include at least one image-capturing unit 110, a vehicle exterior environment recognition apparatus 120, and a vehicle controller (e.g., an engine control unit (ECU)) 130. The number of the image-capturing units 110 may be, for example but not limited to, two, in the example implementation.

The two image-capturing units 110 each may include an imaging device such as, but not limited to, a charge-coupled device (CCD) and a complementary metal-oxide semiconductor (CMOS). The image-capturing units 110 each may capture an image of an environment outside and ahead of an own vehicle 1 (i.e., vehicle exterior environment), and may generate a luminance image (e.g., color image or monochrome image) including at least luminance information. The two image-capturing units 110 may be disposed separated away from each other in a substantially horizontal direction. The two image-capturing units 110 may be disposed so that their respective optical axes are to be substantially parallel to each other along a traveling direction of the own vehicle 1. The image-capturing units 110 may continuously generate a luminance image for each frame of, for example but not limited to, 1/60 second (at a frame rate of 60 fps). The luminance image may be obtained as a result of the image capturing performed on a detection region ahead of the own vehicle 1. Non-limiting examples of a three-dimensional object to be recognized with the image-capturing units 110 may include a three-dimensional object independently present, as well as an object identifiable as a part of the three-dimensional object. Non-limiting examples of the independently-present three-dimensional object may include a bicycle, a pedestrian, a vehicle, a traffic light, a road sign, a guardrail, and a building. Non-limiting examples of the object identifiable as a part of the three-dimensional object may include a wheel of a bicycle.

The vehicle exterior environment recognition apparatus 120 may receive the respective luminance images from the two image-capturing units 110, and perform a so-called pattern matching between the luminance images. The pattern matching may involve extracting any block from one of the luminance images and searching the other luminance image for a block corresponding to the extracted block. The block may be, for example but not limited to, an array of four horizontal pixels and four vertical pixels. Through the pattern matching, the vehicle exterior environment recognition apparatus 120 may derive parallax information indicating a parallax and a position of any block in the luminance image. As used herein, the term "horizontal" refers to a lateral direction of a screen of the captured image, and the term "vertical" refers to a longitudinal direction of the screen of the captured image. In the example pattern matching, luminance (Y) may be compared per block between the two luminance images. Non-limiting examples of a scheme for the comparison may include SAD (Sum of Absolute Difference) that obtains luminance differences, SSID (Sum of Squared Intensity Difference) that uses the squared differences, and ZNCC (Zero-mean Normalized Cross Correlation) that obtains similarity of variance calculated by subtracting an average luminance value from a luminance value of each pixel. The vehicle exterior environment recognition apparatus 120 may perform the parallax deriving process for all blocks in the detection region, on a block basis. The detection region may be, for example but not limited to, an array of 600 horizontal pixels by 200 vertical pixels. In this example implementation, each block may include the array of four horizontal pixels by four vertical pixels; however, any number of pixels may be included in each block.

The vehicle exterior environment recognition apparatus 120 may derive the parallax per block, i.e., on a detection resolution basis. However, the vehicle exterior environment recognition apparatus 120 may have difficulties in recognizing which part of the three-dimensional object the block belongs to and which type the three-dimensional object is. Hence, the parallax information may be derived independently on the detection resolution basis (e.g., on the block basis) with respect to the detection region, not on a three-dimensional object basis. An image in association with the derived parallax information is hereinafter referred to as a "distance image", for discrimination from the luminance image describe above.

Figure 2A:
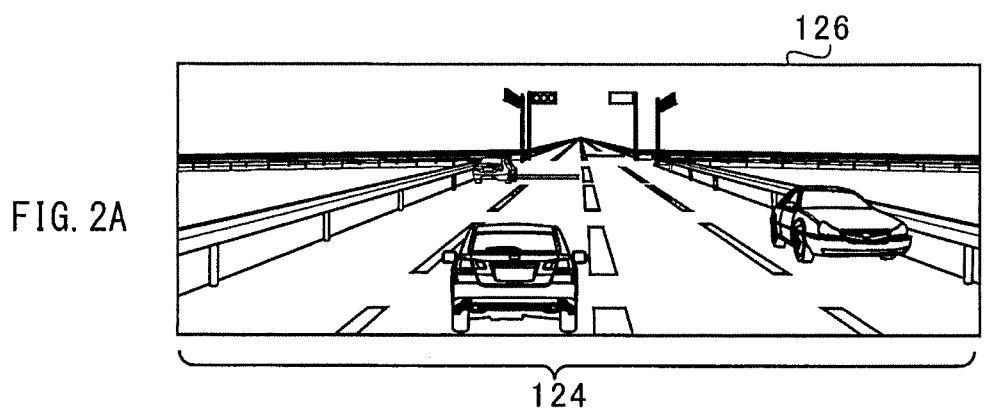
FIG. 2A is a diagram illustrating an example luminance image.
Figure 2B:
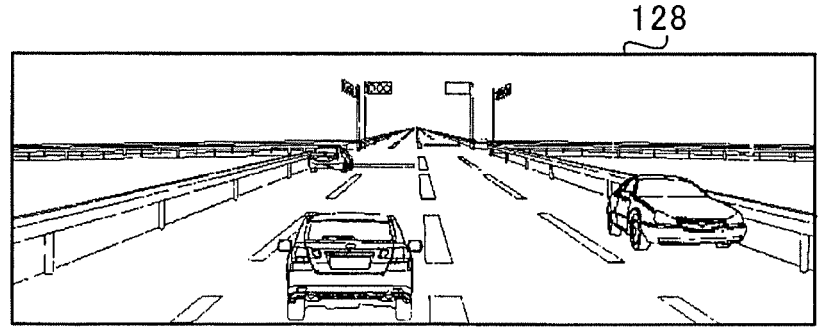
FIG. 2B is a diagram illustrating an example distance image.

FIG. 2A illustrates an example of the luminance image (luminance image 126), and FIG. 2B illustrates an example of the distance image (distance image 128). For example, the two image-capturing units 110 may generate the respective luminance images 126 of a detection region 124, as illustrated in FIG. 2A. Note that only one of the luminance images 126 is schematically illustrated in FIG. 2A for easier understanding of the example implementation of the technology. The vehicle exterior environment recognition apparatus 120 may obtain a parallax per block from the luminance images 126 and generate the distance image 128 illustrated in FIG. 2B. Each block in the distance image 128 may be associated with the corresponding parallax. For convenience of illustration, the blocks in association with the respective parallaxes are each represented by a solid dot, in FIG. 2B.

The vehicle exterior environment recognition apparatus 120 may also identify a road surface using three-dimensional position information in a real space. The three-dimensional position information may include a luminance value (e.g., color value) calculated from the luminance image 126 and a relative distance from the own vehicle 1 calculated from the distance image 128. Thereafter, the vehicle exterior environment recognition apparatus 120 may perform grouping of blocks that are located on the identified road surface, equal to each other in color values, and close to each other in the three-dimensional position information, into a single three-dimensional object. Thereafter, the vehicle exterior environment recognition apparatus 120 may identify to which object (e.g., the preceding vehicle or bicycle) the three-dimensional object in the detection region ahead of the own vehicle 1 corresponds. After the identification of the three-dimensional object, the vehicle exterior environment recognition apparatus 120 may perform control of the own vehicle 1 to avoid contact with the three-dimensional object (i.e., contact avoidance control) or control of the own vehicle 1 to keep a predetermined inter-vehicular distance from the preceding vehicle (i.e., cruise control) for safety. The relative distance may be determined by converting the parallax information per block of the distance image 128 into the three-dimensional position information by a so-called stereo method. The stereo method may derive, from the parallax of any part of the three-dimensional object, the relative distance between the part of the three-dimensional object and the image-capturing units 110 by a triangulation method.

The vehicle controller 130 may control the own vehicle 1 by receiving information on an operation input of the driver through a steering wheel 132, an accelerator pedal 134, and a brake pedal 136 and sending the information to a steering mechanism 142, a drive mechanism 144, and a brake mechanism 146. The vehicle controller 130 may also control the steering mechanism 142, the drive mechanism 144, and the brake mechanism 146, in accordance with instructions from the vehicle exterior environment recognition apparatus 120.

As described above, the vehicle exterior environment recognition system 100 may perform the grouping of blocks that are equal to each other in color values and close to each other in the three-dimensional position information, into a single three-dimensional object. For example, when a preceding vehicle presents ahead of the own vehicle 1, a plurality of blocks that correspond to a rear surface of the preceding vehicle and thus are equal to each other in relative distance may be grouped into a three-dimensional object. The three-dimensional object may be identified as a preceding vehicle depending on its feature.

However, in a case where a relative distance from the own vehicle 1 to a middle portion of the rear surface of the preceding vehicle is difficult to be obtained due to a factor, such as backlight, and only a relative distance from the own vehicle 1 to two opposite side portions of the preceding vehicle that are separated from each other is obtained, the two opposite side portions that should be identified as a unified preceding vehicle can be misidentified as two different three-dimensional objects that are separated from each other. One possible measure to identify the two opposite side portions separated from each other as a unified object may include simple relaxation of a threshold range of relative distance or a threshold value for identification of a unified three-dimensional object. However, such simple relaxation of the threshold value can cause misidentification, as a unified three-dimensional object, of three-dimensional objects, such as road cones, that are separated from each other and aligned at respective positions distant from the own vehicle 1 by the same relative distance. Accordingly, an object of at least one implementation of the technology is to achieve proper extraction of a three-dimensional object that should be identified as a unified preceding vehicle by utilizing a relation between the three-dimensional object and the road surface.

In the following, a description is given in detail of a configuration of the vehicle exterior environment recognition apparatus 120 that achieves the example object of at least one implementation of the technology. Given here is a detailed description of an example process of identifying a road surface and a three-dimensional object in the detection region ahead of the own vehicle 1, which is one feature of this example implementation. Note that a configuration less related to features of the implementation will not be described in detail.

[Vehicle Exterior Environment Recognition Apparatus 120]

Figure 3:
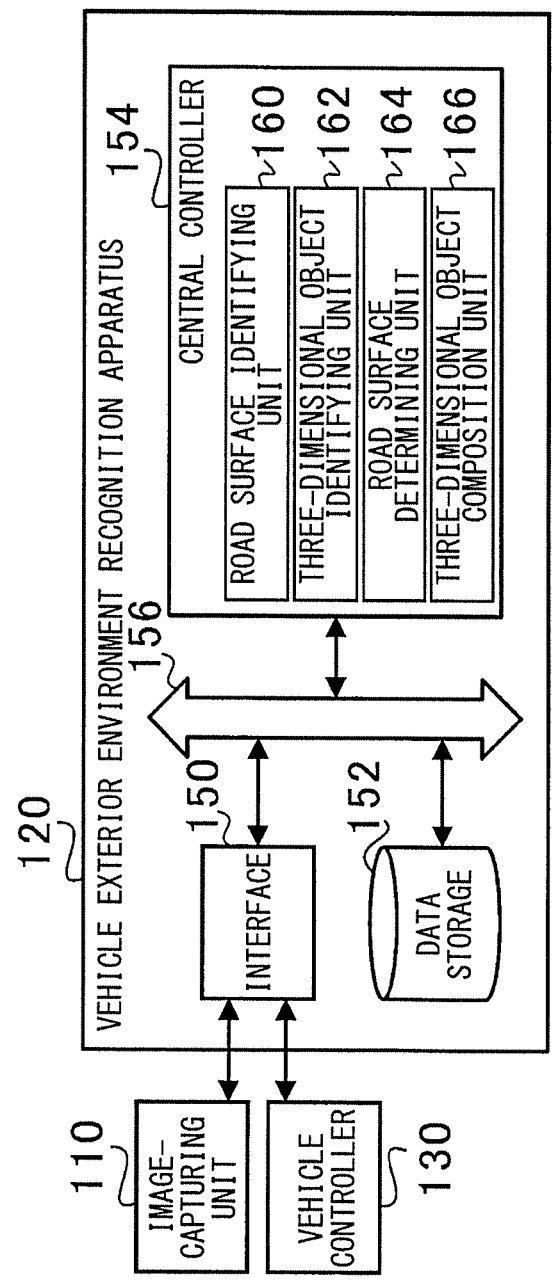
FIG. 3 is a block diagram illustrating a schematic configuration of a vehicle exterior environment recognition apparatus according to one implementation of the technology.

FIG. 3 is a block diagram illustrating a schematic configuration of the vehicle exterior environment recognition apparatus 120 according to an example implementation of the technology. As illustrated in FIG. 3, the vehicle exterior environment recognition apparatus 120 may include an interface 150, a data storage 152, and a central controller 154.

The interface 150 may exchange information bidirectionally between devices including, without limitation, the image-capturing unit 110 and the vehicle controller 130. The data storage 152 may include a random access memory (RAM), a flash memory, a hard disk drive (HDD), or any other suitable storage device. The data storage 152 may store various pieces of information necessary for processes to be carried out by components described hereinafter.

The central controller 154 may include a semiconductor integrated circuit, and may control devices including, without limitation, the interface 150 and the data storage 152 through a system bus 156. The semiconductor integrated circuit may have devices such as, but not limited to, a central processing circuit (CPU), a read only memory (ROM) in which programs, etc., are stored, and a random access memory (RAM) serving as a work area. In this example implementation, the central controller 154 may also serve as a a road surface identifying unit 160, a three-dimensional object identifying unit 162, a road surface determining unit 164, and a three-dimensional object composition unit 166. In the following, a vehicle exterior environment recognition procedure that identifies a road surface is described in detail as one feature of this example implementation, with reference to the operation of each of the components of the central controller 154.

[Vehicle Exterior Environment Recognition Procedure]

Figure 4:
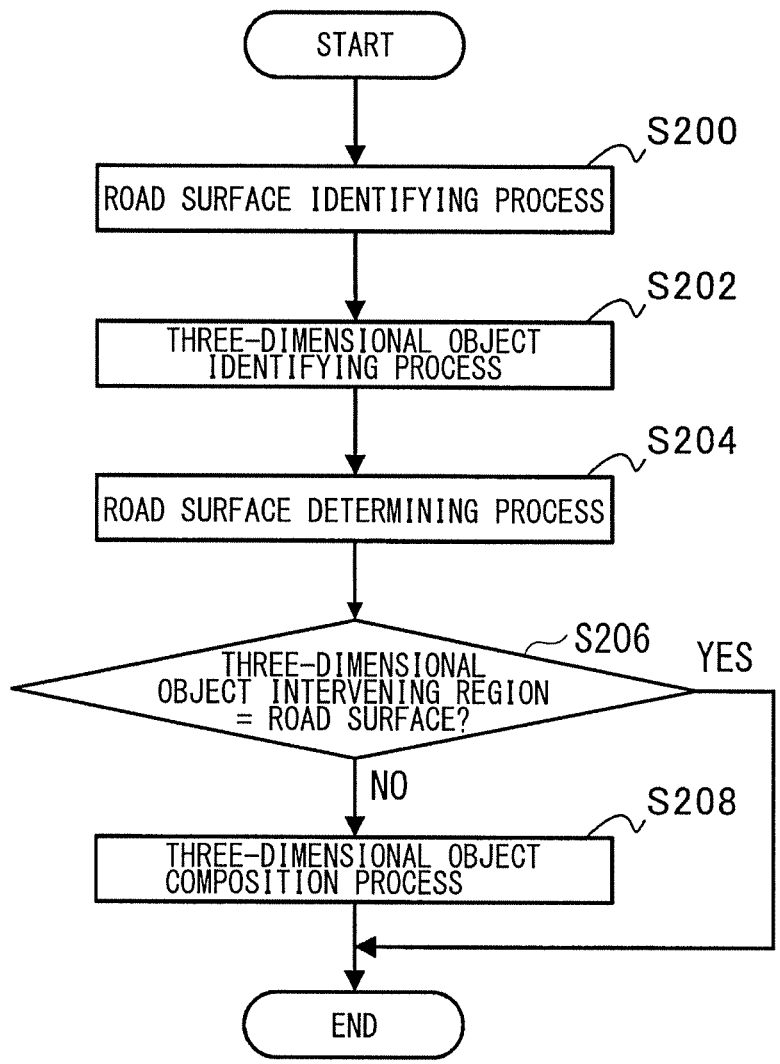
FIG. 4 is a flowchart illustrating an example vehicle exterior environment recognition procedure.

FIG. 4 is a flowchart of an example of the vehicle exterior environment recognition procedure. In the vehicle exterior environment recognition procedure, the road surface identifying unit 160 performs a road surface identifying process (S200) of identifying a road surface in the image. Thereafter, the three-dimensional object identifying unit 162 performs a three-dimensional object identifying process (S202) of identifying a three-dimensional object on the basis of the identified road surface. Thereafter, the road surface determining unit 164 performs a road surface determining process (S204) of determining whether a region between three-dimensional objects that are separated from each other and distant from the own vehicle 1 by the same relative distance has a correspondence to the road surface. When the road surface determining unit 164 determines that the region between the three-dimensional objects has the correspondence to the road surface (YES in S206), the vehicle exterior environment recognition procedure may be terminated. When the road surface determining unit 164 determines that the region between the three-dimensional objects has no correspondence to the road surface (NO in S206), the three-dimensional object composition unit 166 performs a three-dimensional object composition process (S208) of regarding the three-dimensional objects that are separated from each other as candidate parts of a unified three-dimensional object. In one implementation of the technology, the region between the three-dimensional objects may serve as a "three-dimensional-object-intervening region".

[Road Surface Identifying Process S200]

The road surface identifying unit 160 identifies a road surface region that corresponds to the road surface in the luminance image 126 or the distance image 128. For example, firstly, the road surface identifying unit 160 identifies the road surface region on the basis of right and left lane lines (e.g., white lines) of a lane on which the own vehicle 1 is traveling.

Figure 5A:
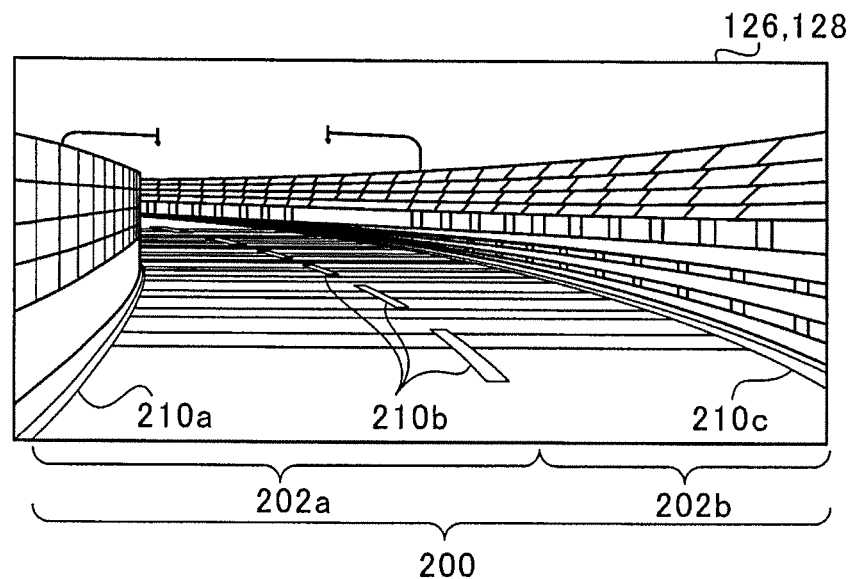
FIGS. 5A and 5B are diagrams illustrating an example process of identifying a road surface region.
Figure 5B:
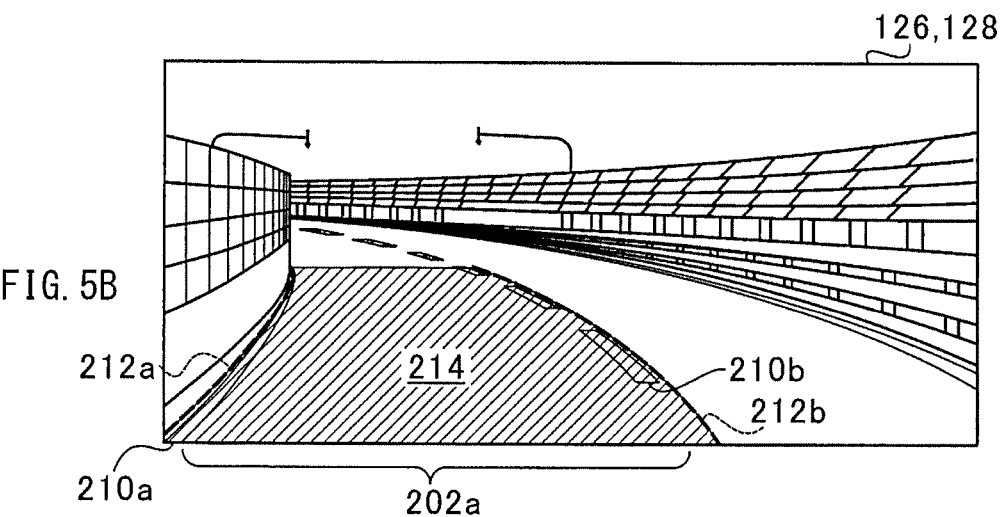

FIGS. 5A and 5B illustrate an example of the road surface identifying process. The road surface may be provided with lane lines for smooth traveling of a vehicle. In the example illustrated in FIG. 5A, for example, the road 200 in the luminance image 126 may be divided into two lanes 202a and 202b by a total of three lane lines 210a, 210b, and 210c. The lane line 210b may be provided in the middle of the road 200 along the horizontal direction. The lane line 210b may be hereinafter referred to as middle lane line 210b. The lane lines 210a and 210c may be provided on respective ends of the road 200. The lane lines 210a may be hereinafter referred to as a left lane line 210a, and the lane lines 210c may be hereinafter referred to as a right lane line 210c.

Referring to FIG. 5B, the lane 202a on which the own vehicle 1 is traveling may be defined between the left lane line 210a and the middle lane line 210b. In other words, the left lane line 210a may be provided on a leftmost side of the lane 202a, and the middle lane line 210b may be provided on a rightmost side of the lane 202a. The road surface identifying unit 160 may set an imaginary left limit line 212a that is shifted leftward by a predetermined distance (e.g., 10 cm) from the left lane line 210a, as illustrated by a dashed line in FIG. 5B. Likewise, the road surface identifying unit 160 may set an imaginary right limit line 212b that is shifted rightward by a predetermined distance (e.g., 10 cm) from the middle lane line 210b, as illustrated by another dashed line in FIG. 5B. Thereafter, the road surface identifying unit 160 sets a region extending rightward from the left limit line 212a and leftward from the right limit line 212b to be a road surface region 214. In other words, the road surface identifying unit 160 sets a region extending between the left limit line 212a and the right limit line 212b along the horizontal direction (i.e., a hatched region in FIG. 5B) to be the road surface region 214.

In this example implementation, the road surface region may be identified only on the basis of the lane lines on the road surface, but the identification of the road surface region should not be limited to the example implementation. In another example implementation of the technology, the road surface region may be identified on the basis of a future traveling path on which the own vehicle 1 is predicted to travel at a current steering angle, a current turning angle rate (i.e., yaw rate), and a current speed, in addition to the lane lines on the road surface. For example, a road surface region that horizontally extends in 2.5 meters or less in either side from a curve line indicating the future traveling path ahead of the own vehicle 1 may be identified as the road surface region. Such complementary identification improves accuracy in identifying the road surface region.

Thereafter, the road surface identifying unit 160 may extract, from the road surface region 214 in the distance image 128, all of the blocks having the respective relative distances (i.e., all of the blocks of which relative distances are obtained through the pattern matching). The road surface identifying unit 160 may generate a road surface model on the basis of the extracted blocks. The generation of the road surface model will now be described.

Figure 6:
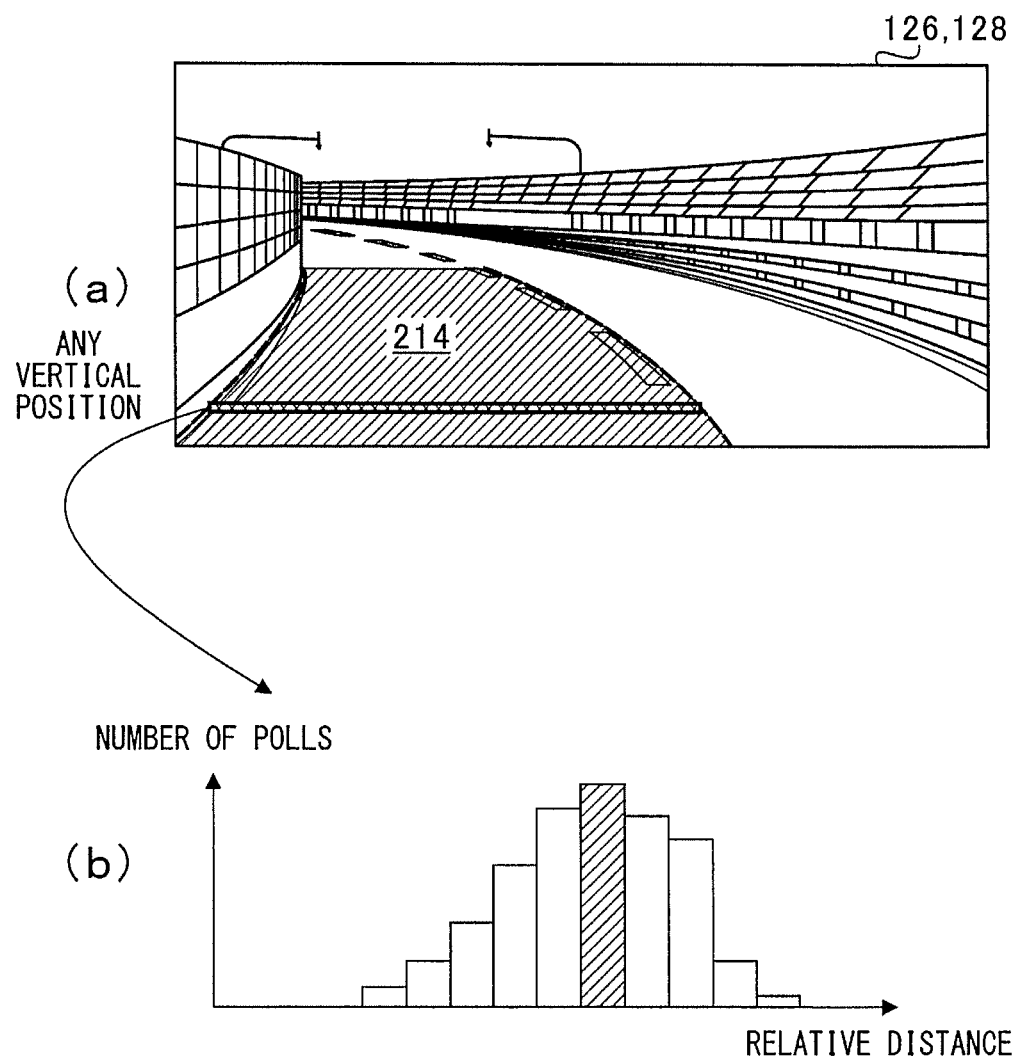
FIG. 6 is a diagram illustrating an example of a histogram.
Figure 7A:
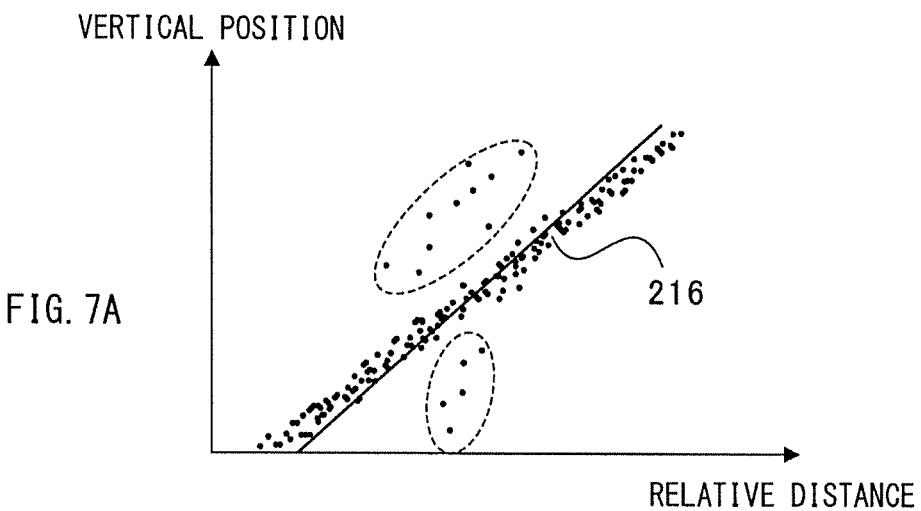
FIGS. 7A to 7C are diagrams illustrating an example of a road surface model.
Figure 7B:
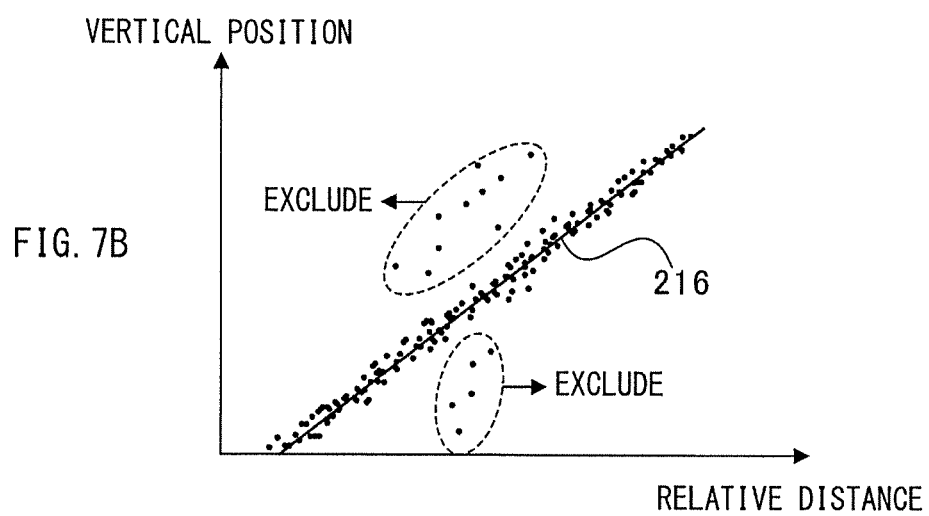
Figure 7C:
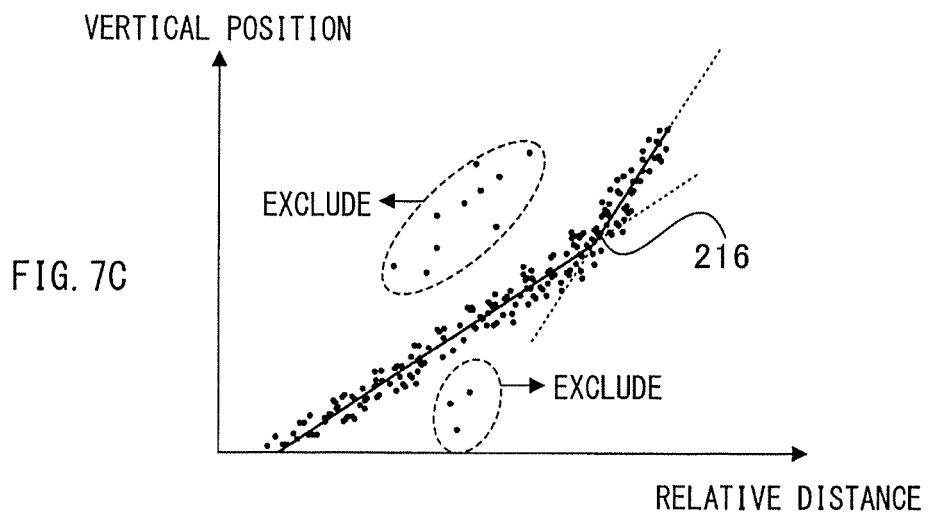

FIG. 6 illustrates generation of an example histogram, and FIGS. 7A to 7C each illustrate an example of the road surface model. First, the road surface identifying unit 160 may generate a histogram of the relative distances of any horizontal array of blocks along the horizontal direction in the road surface region 214. For example, the road surface identifying unit 160 may poll the relative distances of any blocks located at the same vertical position in the road surface region 214 in the image. In other words, the road surface identifying unit 160 may poll the relative distances of all blocks in any horizontal array (e.g., a cross-hatched array in (a) of FIG. 6). On the basis of the polled relative distances, a histogram regarding any vertical position may be generated, as illustrated in (b) of FIG. 6.

A hatched bar in the histogram indicates a relative distance having a maximum number of polls. The road surface identifying unit 160 may set the relative distance indicated by the hatched bar to be a representative distance of the vertical position. The road surface identifying unit 160 may repeat such a process for another vertical position while changing a vertical position of interest in the road surface region 214, to derive the representative distances of respective vertical positions in the road surface region 214.

For example, the road surface model 216 may be represented by a relation between a vertical axis indicating the vertical position in the distance image 128 and a horizontal axis indicating the relative distance in the distance image 128. The road surface identifying unit 160 may plot, at the respective vertical positions, the representative distances of the respective vertical positions (i.e., the representative distances of the respective horizontal arrays of blocks) to generate point groups illustrated in FIG. 7A. From the point groups, the road surface identifying unit 160 may generate an approximate straight line, which is illustrated by a solid line in FIG. 7A, by a least squares method, for example. The road surface identifying unit 160 may set the approximate straight line to be the road surface model 216. The road surface model 216 helps to identify a varying feature, such as gradient, of the road surface. As used herein, the term "varying feature" refers to how the road surface varies. In this example implementation, the road surface model 216 may be derived in the form of the approximate straight line for the purpose of illustration; however, the road surface model 216 may be derived in the form of a multi-dimensional approximated curve, in an alternative implementation of the technology.

The approximate straight line generated simply by the least squares method, however, can include noise representative distances. The noise representative distances may include error representative distances that are obtained by erroneous pattern matching in the road surface region 214, for example. Inclusion of such noise representative distances, which should be practically excluded, can cause deviation of the resultant approximate straight line from an appropriate position or inclination, as illustrated in FIG. 7A. This deviation can lead to improper determination of a road having a gradient to be a three-dimensional object, or a failure in extracting a three-dimensional object actually present.

To address such a concern, in an example implementation of the technology, the Hough transform may be performed which detects a straight line in an image. Through the Hough transform, only a point group of representative distances that form a common straight line, or only a point group of representative distances that form no common straight line but form straight lines parallel to and close to each other (i.e., straight lines apart from each other by a distance within a predetermined range) may be remained, whereas the other point groups of representative distances (e.g., point groups each surrounded by a dashed line in FIG. 7A) may be excluded as the noise representative distances. The road surface identifying unit 160 may perform the least squares method only on the remaining point group of representative distances to derive an approximate straight line from the point group. Through these processes, the road surface model 216 may be generated in the form of the appropriate approximate straight line on the basis of the proper representative distances, as illustrated in FIG. 7B. Since the Hough transform is a currently-available technique for deriving a common straight line passing through a plurality of points, the description thereof is not described in detail herein.

In this example implementation, the varying feature of the road surface may be represented in the form of the approximate straight line. The road in the detection region, however, does not necessarily vary in the same fashion. For example, the road in the detection region may have a steep inclination, in some cases. In such cases, the Hough transform can exclude most of representative distances corresponding to a region of the road surface following the steep inclination, as the noise representative distances.

To address such a concern, an example implementation of the technology may derive another approximate straight line from the point group of the representative distances excluded by the Hough transform, in a case where the number of the representative distances excluded by the Hough transform is equal to or greater than a predetermined number and have continuity to each other. It is indisputable that noise representative distances may be excluded also in the generation of the other approximate straight line. Through these processes, the road surface model 216 may be generated in the form of two approximate straight lines continuous to each other, as illustrated in FIG. 7C.

Alternatively, the two approximate straight lines derived through the processes described above may intersect with each other at a predetermined angle, or may be coupled to each other with a transition curve having a predetermined radius. Additionally, although the two approximate straight lines may be generated in the foregoing example implementations, three or more approximate straight lines may be generated for a road with lots of variations.

[Three-Dimensional Object Identifying Process S202]

The three-dimensional object identifying unit 162 may identify a three-dimensional object having a height extending vertically upward from the road surface on the basis of the road surface model 216 generated as described above.

Figure 8:
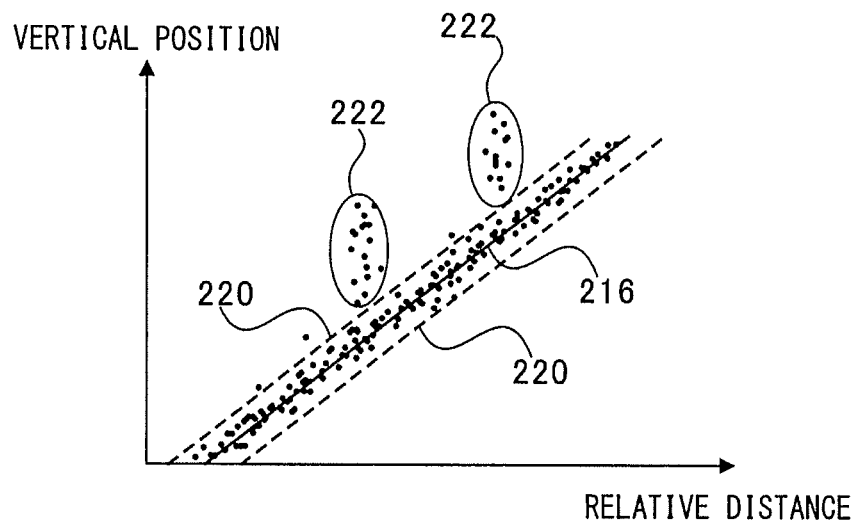
FIG. 8 is a diagram illustrating an example process of identifying a three-dimensional object performed by a road surface identifying unit.

FIG. 8 is a diagram illustrating an example process of identifying a three-dimensional object performed by the three-dimensional object identifying unit 162. In FIG. 8, the road surface model 216 of the road surface region 214 at any timing is represented in the form of a straight line, and the blocks extending over the entire image and having the respective relative distances are plotted at the respective relative distances and the respective vertical positions.

The three-dimensional object identifying unit 162 may compare the relative distance of each of the blocks with the road surface model 216 to determine whether the block corresponds to part of a three-dimensional object. For example, the three-dimensional object identifying unit 162 may determine a block located within a road surface range 220 to correspond to part of the road surface. The road surface range 220 may be a region defined between an upper limit and a lower limit that are respectively indicated by dashed lines in FIG. 8. The upper limit may be higher than the road surface model 216 by a predetermined distance (e.g., about 30 cm), and the lower limit may be lower than the road surface model 216 by a predetermined distance (e.g., about 30 cm).

On the other hand, the three-dimensional object identifying unit 162 may regard a block located outside the road surface range 220 and above the upper limit of the road surface range 220 as a candidate part of a three-dimensional object, because the block protrudes upward from the road surface. The three-dimensional object identifying unit 162 may thereafter perform grouping of the blocks that are regarded as the candidate parts of a three-dimensional object having a height extending vertically upward from the road surface and that are equal to each other in the relative distance, into one group 222, which is surrounded by an oval in FIG. 8. The three-dimensional object identifying unit 162 may identify the group 222 to be a three-dimensional object. There are various currently-available technologies for determining three-dimensionality (e.g., shape, size, etc.) of the point group identified as a three-dimensional object and for determining which part of the three-dimensional object the point group belongs to; therefore, the description of the technologies is not described in detail herein.

Note that the three-dimensional object identifying unit 162 may perform extraction of blocks that correspond to the road surface in parallel to the extraction of the blocks that correspond to the three-dimensional object. The blocks that correspond to the road surface may be used in the three-dimensional object composition process S208 described below.

Figure 9:
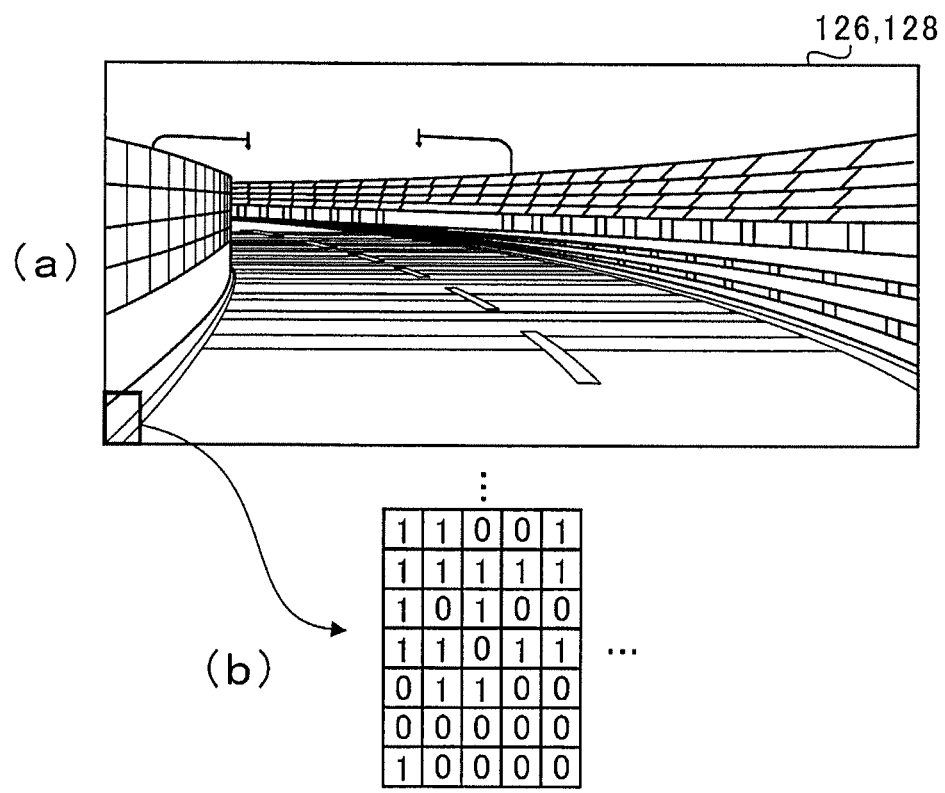
FIG. 9 is a diagram illustrating an example of a process performed on blocks corresponding to the road surface.

FIG. 9 illustrates an example process performed on blocks corresponding to the road surface. In this example implementation, an array of five horizontal blocks by seven vertical blocks may be extracted from a lower-left part of the luminance image 126 or the distance image 128 illustrated in (a) of FIG. 9, for convenience of illustration.

For example, in a case where a block in the extracted array of blocks has a relative distance that is located within the road surface range 220 (i.e., has a height extending in either vertical direction from the road surface model 216 by a predetermined distance (e.g., 30 cm)), the three-dimensional object identifying unit 162 determines that the block has a correspondence to the road surface, and may assign "1" to the block.

In contrast, in a case where a block in the extracted array of blocks has a relative distance that is located outside the road surface range 220, the three-dimensional object identifying unit 162 determines that the block has no correspondence to the road surface, and may assign "0 (zero)" to the block. In a case where a block in the extracted array of blocks has no relative distance, the three-dimensional object identifying unit 162 determines that the block has no correspondence to the road surface, and may assign "0" to the block. In this way, each of the blocks in the image may be assigned with "1" or "0", as illustrated in (b) of FIG. 9. The determination of whether a block has a correspondence to the road surface is hereinafter also referred to as "determination of correspondence to the road surface".

Thereafter, the three-dimensional object identifying unit 162 may perform integration of the results (i.e., determination values) of the determination of correspondence to the road surface, on a block basis, along both or one of the vertical direction and the horizontal direction.

Figure 10:
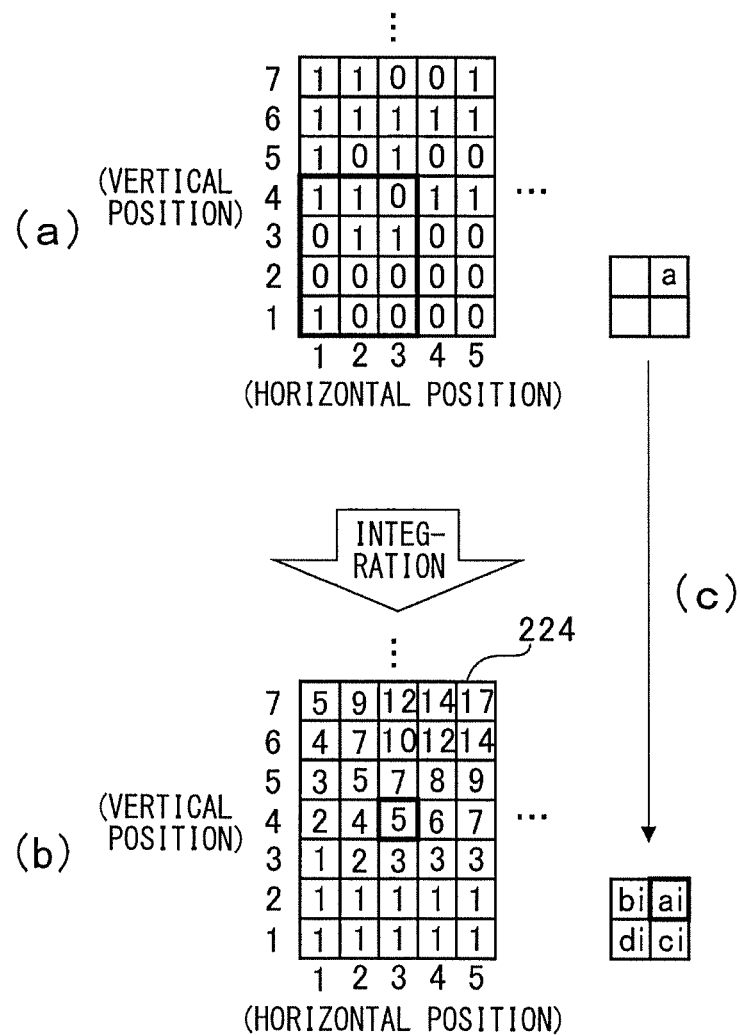
FIG. 10 is a diagram illustrating an example integration process performed by the road surface identifying unit.

FIG. 10 illustrates an example of the integration process performed by the three-dimensional object identifying unit 162. Also in this example implementation, the array of five horizontal blocks by seven vertical blocks may be extracted from the lower-left part of the luminance image 126 or the distance image 128 illustrated in (a) of FIG. 9, for convenience of illustration.

The three-dimensional object identifying unit 162 may perform integration of the determination values assigned to all of the blocks that are located leftward and downward from any predetermined block. The determination values may be obtained through the determination of correspondence to the road surface, and may be each represented as "1" or "0" as described above. For example, referring to FIG. (b) of 10, an integrated value of a predetermined block located at a horizontal position 3 and a vertical position 4 may be an integrated value of a total of twelve blocks that includes the predetermined block and all the blocks located leftward and downward from the predetermined block (i.e., the blocks located at horizontal positions 1 to 3 and vertical positions 1 to 4). In this example implementation, five blocks out of the twelve blocks are each assigned with "1" as illustrated in (a) of FIG. 10; therefore, the integrated value of the predetermined block located at the horizontal position 3 and the vertical position 4 is "5".

Note that the integrated value of any predetermined block is readily calculated using blocks adjacent to the predetermined block. For example, referring to (c) of FIG. 10, an integrated value "ai" of the predetermined block may be calculated by the following expression:

$$a + bi + ci - di$$

where "a" represents the determination value of the predetermined block that is obtained through the determination of correspondence to the road surface, "bi" represents an integrated value of a block at the immediate left of the predetermined block, "ci" represents an integrated value of a block immediately below the predetermined block, and "di" represents an integrated value of a block at the immediate lower left of the predetermined block. Note that, when no corresponding block exists in a left-end part or a bottom-end part of the image, "0" may be assigned to a deemed block.

For example, the integrated value of the predetermined block at the horizontal position 3 and the vertical position 4 illustrated in (b) of FIG. 10 is "5", which is calculated by the expression 0+4+3−2, where "0" is the determination value of the predetermined block obtained through the determination of correspondence to the road surface, "4" is the integrated value of the block at the immediate left of the predetermined block, "3" is the integrated value of the block immediately below the predetermined block, and "2" is the integrated value of the block at the immediate lower left of the predetermined block. In this way, an integrated value map 224 illustrated in (b) of FIG. 10, for example, may be generated.

Note that the three-dimensional object identifying unit 162 may perform the determination of correspondence to the road surface illustrated in (a) of FIG. 10 and the integration of the determination values illustrated in (b) of FIG. 10 in parallel to each other. In an example implementation of the technology, the three-dimensional object identifying unit 162 may perform the determination of correspondence to the road surface for each predetermined block from the lower-left part of the image in a rightward direction along the horizontal side of the image, while calculating the integrated value of the predetermined block using the integrated values of blocks adjacent to the predetermined block that are based on the determination values. After reaching a block at an end point of the horizontal side (i.e., a right end) of the image, the three-dimensional object identifying unit 162 may perform the determination of correspondence to the road surface for each block located at a vertical position immediately above the vertical position of the processed blocks, from a starting point of the horizontal side (i.e., a left end) of the image in the rightward direction along the horizontal side of the image, while calculating the integrated value of the block using the integrated values of blocks adjacent to the block that are based on the determination values.

Such parallel execution of the determination of correspondence to the road surface and the integration of the determination values helps to reduce processing load.

[Road Surface Determining Process S204]

Figure 11A:
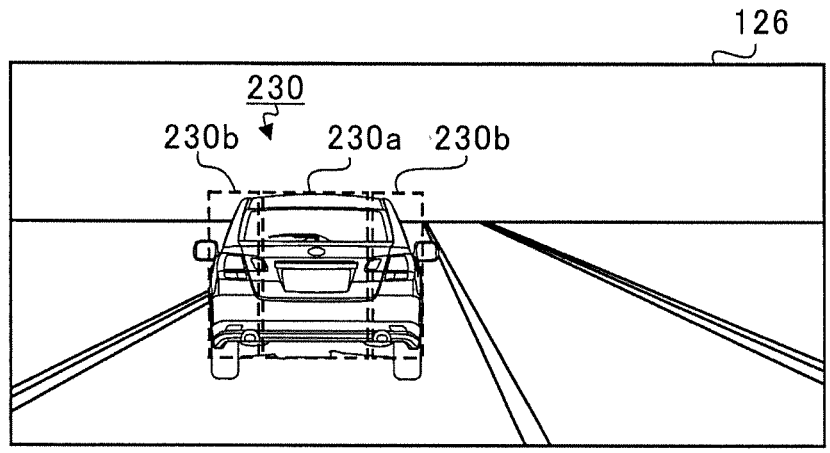
FIGS. 11A and 11B are diagrams illustrating an example process performed by a road surface determining unit.
Figure 11B:
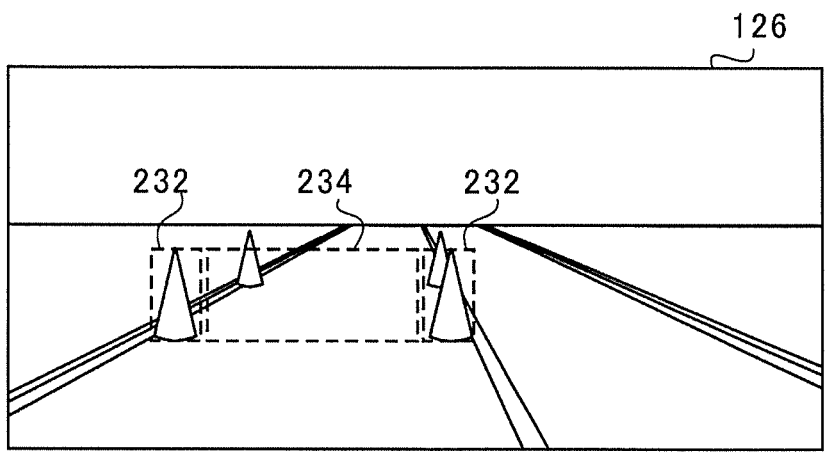

FIGS. 11A and 11B illustrate an example process performed by the road surface determining unit 164. The luminance image 126 illustrated in FIG. 11A may include an image of a preceding vehicle 230. In this example implementation, however, a relative distance from the own vehicle 1 to a middle portion 230a of the rear surface of the preceding vehicle 230 is difficult to be obtained due to a factor, such as backlight, and only a relative distance from the own vehicle 1 to the opposite side portions 230b of the preceding vehicle 230 that are separated from each other is obtained. Accordingly, the two opposite side portions 230b that should be identified as a unified preceding vehicle 230 can be misidentified as two different three-dimensional objects that are separated from each other.

The luminance image 126 illustrated in FIG. 11B may include an image of a plurality of three-dimensional objects 232. In this example implementation, the three-dimensional objects 232 are four road cones, and a relative distance from the own vehicle 1 to each of the three-dimensional objects 232 is properly obtained. Of the four three-dimensional objects 232, two three-dimensional objects 232 located more adjacent to the own vehicle 1 than the other two three-dimensional objects 232 are equal to each other in the relative distance. Accordingly, in both the example illustrated in FIG. 11A and the example illustrated in FIG. 11B, the two different three-dimensional objects are separated from each other and are equal to each other in the relative distance; however, the two different three-dimensional objects (opposite side portions 230b) should be identified as the unified preceding vehicle 230 in the example illustrated in FIG. 11B, whereas the two different three-dimensional objects 232 should be identified as two different three-dimensional objects in the example illustrated in FIG. 11B.

It is found through the comparison between FIG. 11A and FIG. 11B that an object to which blocks in a three-dimensional-object-intervening region between the three-dimensional objects of FIG. 11A correspond is different from an object to which blocks in a three-dimensional-object-intervening region between the three-dimensional objects of FIG. 11B correspond. For example, the object to which the blocks in the three-dimensional-object-intervening region of FIG. 11A correspond may be the middle portion 230a of the preceding vehicle 230. The object is thus unlikely to be identified as the road surface. In contrast, the object to which the blocks in the three-dimensional-object-intervening region of FIG. 11B correspond may be the road surface 234. The object is thus likely to be identified as the road surface.

Accordingly, when the three-dimensional objects are separated from each other and are distant from the own vehicle 1 by the same relative distance, the road surface determining unit 164 determines whether the three-dimensional-object-intervening region has a correspondence to the road surface. Various ways may be conceivable which are used for determining whether the three-dimensional-object-intervening region has the correspondence to the road surface. In an example implementation of the technology, the determination of whether the three-dimensional-object-intervening region has the correspondence to the road surface may be performed on the basis of the density of the blocks that are determined to have the correspondence to the road surface.

In this example implementation, when the two three-dimensional objects are separated from each other and are distant from the own vehicle 1 by the same relative distance, the road surface determining unit 164 may identify the three-dimensional-object-intervening region between the two three-dimensional objects. For example, the road surface determining unit 164 may determine a vertical length of the three-dimensional-object-intervening region on the basis of respective maximum lengths of the two three-dimensional objects. Thereafter, the road surface determining unit 164 may derive a rectangular region that has the determined vertical length and a horizontal length extending from a right end portion of one of the three-dimensional objects located on the left of the image to a left end portion of the other three-dimensional object located on the right of the image. The road surface determining unit 164 may set the rectangular region to be the three-dimensional-object-intervening region.

Thereafter, the road surface determining unit 164 may calculate the integrated value of each block in the identified three-dimensional-object-intervening region.

Figure 12:
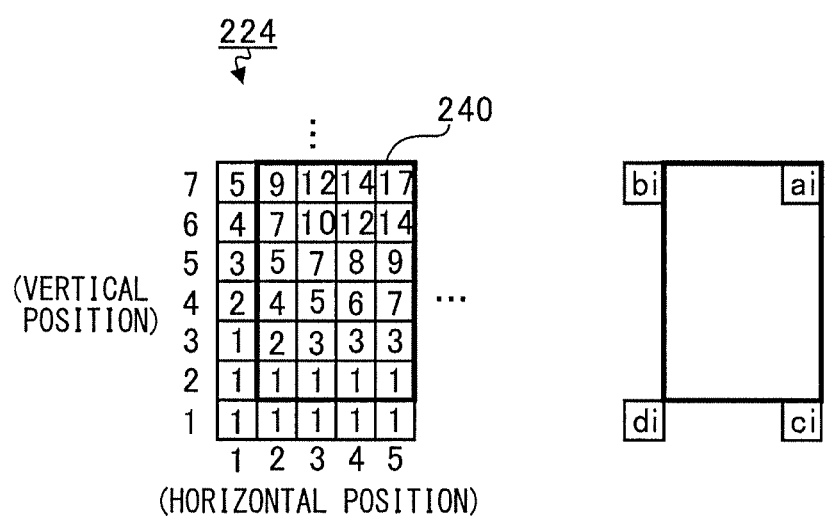
FIG. 12 is a diagram illustrating an example process performed by the road surface determining unit.

FIG. 12 illustrates an example process performed by the road surface determining unit 164. For example, a region 240 in the integrated value map 224 may be identified as the three-dimensional-object-intervening region, as illustrated in (a) of FIG. 12. In (a) of FIG. 12, the region 240 or the three-dimensional-object-intervening region is enclosed by a heavy line, and may include a total of 24 blocks that are located at horizontal positions 2 to 5 and vertical positions 2 to 7. The integrated value of each of the blocks in the region 240 may be calculated by simply adding the determination values of the blocks assigned with "1" (i.e., blocks determined to have the correspondence to the road surface) in the region 240; however, such addition can take much more time for a larger three-dimensional-object-intervening region including a larger number of the blocks. To reduce such a load, in this example implementation, the integrated value may be readily calculated using the integrated value map 224.

Referring to (b) of FIG. 12, for example, an integrated value of any predetermined three-dimensional-object-intervening region may be calculated by the following expression:

$$ai - bi - ci + di$$

where "ai" represents an integrated value of a block located at an upper-right internal part of the predetermined three-dimensional-object-intervening region, "bi" represents an integrated value of a block at an immediate left of a block located at an upper-left internal part of the predetermined three-dimensional-object-intervening region, "ci" represents an integrated value of a block immediately below a block located at a lower-right internal part of the predetermined three-dimensional-object-intervening region, and "di" represents an integrated value of a block at an immediate lower left of a block located at a lower-left internal part of the predetermined three-dimensional-object-intervening region. Note that, when no corresponding block exists at a left-end part or a bottom-end part of the image, "0" may be assigned to a deemed block.

For example, as illustrated in (a) of FIG. 12, the integrated value of the region 240 that includes the blocks located at the horizontal positions 2 to 5 and the vertical position 2 to 7 is "12", which is calculated by the expression 17−5−1+1, where, in order, "17" is the integrated value of the block located at the upper-right internal part of the predetermined three-dimensional-object-intervening region, "5" is the integrated value of the block at the immediate left of the block located at the upper-left internal part of the predetermined three-dimensional-object-intervening region, "1" is the integrated value of the block immediately below the block located at the lower-right internal part of the predetermined three-dimensional-object-intervening region, and the "1" is the integrated value of the block at the immediate lower left of the block located at the lower-left internal part of the predetermined three-dimensional-object-intervening region. In this way, the integrated value of the three-dimensional-object-intervening region is readily obtained.

Thereafter, the road surface determining unit 164 may calculate the density of the blocks that are determined to have the correspondence to the road surface (i.e., blocks each assigned with "1") by dividing the integrated value of the three-dimensional-object-intervening region by the area of the three-dimensional-object-intervening region. In the example illustrated in (a) of FIG. 12, for example, the density is 50%, which is calculated by 12/24.

When the calculated density is not less than a predetermined threshold (e.g., 50%), the road surface determining unit 164 determines that the three-dimensional-object-intervening region has a correspondence to the road surface. In contrast, when the calculated density is less than the predetermined threshold, the road surface determining unit 164 determines that the three-dimensional-object-intervening region has no correspondence to the road surface. In the example illustrated in (a) of FIG. 12, for example, the road surface determining unit 164 determines that the three-dimensional-object-intervening region has a correspondence to the road surface, since the density of the blocks determined to have the correspondence to the road surface is 50%.

Through such a road surface determining process (S204), whether the three-dimensional-object-intervening region has the correspondence to the road surface is properly determined. As a result, the three-dimensional-object-intervening region between the opposite side portions 230b of the rear surface of the preceding vehicle 230 is determined to have no correspondence to the road surface in the example illustrated in FIG. 11A, whereas the three-dimensional-object-intervening region between the three-dimensional objects 232 is determined to have the correspondence to the road surface in the example illustrated in FIG. 11B. When the three-dimensional-object-intervening region is determined to have the correspondence to the road surface, a subsequent process or the three-dimensional object composition process (S208) may not be performed.

[Three-Dimensional Object Composition Process S208]

When the three-dimensional-object-intervening region is determined to have no correspondence to the road surface, as in the example illustrated in FIG. 11A, for example, the three-dimensional object composition unit 166 may regard the three-dimensional objects that are separated from each other as candidate parts of a unified three-dimensional object.

When the candidate parts satisfy another condition for being a three-dimensional object, the opposite side parts 230b of the rear surface of the preceding vehicle 230 are regarded as a unified three-dimensional object, and are eventually identified as a specific object or the preceding vehicle 230.

As described above, the determination of whether the region between three-dimensional objects that are located at respective positions distant from the own vehicle 1 by the same relative distance has a correspondence to the road surface facilitate proper integration of the three-dimensional objects. Accordingly, it is possible to achieve proper extraction and identification of a three-dimensional object.

According to any implementation of the technology, a program also may be provided that causes a computer to serve as the vehicle exterior environment recognition apparatus 120, and a computer-readable recording medium that stores the program. Non-limiting examples of the recording medium may include a flexible disk, a magneto-optical disk, ROM, CD, DVD (Registered Trademark), and BD (Registered Trademark). As used herein, the term "program" may refer to a data processor that is written in any language and any description method.

The central controller 154 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the central controller 154. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the central controller 154 illustrated in FIG. 3.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in at least one foregoing example implementation, the determination values "1" and "0" that are obtained through the determination of correspondence to the road surface may be simply integrated by the three-dimensional object identifying unit 162; however, in consideration of a case where the correspondence to the road surface is not clearly determined, reliability values that indicate a likelihood of correspondence to the road surface may be determined per block, in an alternative example implementation of the technology. In the alternative example implementation, the road surface identifying unit 160 may determine the reliability values (indicated in a range from 0 to 1) per block, and calculate an integrated value, on a block basis, along both or one of the vertical direction and the horizontal direction. This allows for a more definite determination of whether the three-dimensional-object-intervening region has the correspondence to the road surface.

In at least one foregoing example implementation, the three-dimensional object identifying unit 162 may perform integration of the determination values obtained through the determination of correspondence to the road surface or integration of the reliability values that indicate the likelihood of correspondence to the road surface, on a block basis, along both or one of the vertical direction and the horizontal direction. Alternatively, various calculations, such as multiplication, that make it possible to calculate the density of the blocks determined to have the correspondence to the road surface may be used, instead of the integration (or addition).

Further, in at least one foregoing example implementation, the integration of the determination values of the blocks determined to have the correspondence to the road surface or the integration of the reliability values indicating the likelihood of correspondence to the road surface may be performed from the lower-left part of the image in the vertically upward direction or the horizontally rightward direction. However, the integration may be performed along another direction. In another example implementation of the technology, the integration may be performed along both or one of the vertical position and the horizontal direction, from an upper left part, an upper right part, or a lower right part of the image to the direction in which the image exists.

A part or all of the processes in the vehicle exterior environment recognition procedure as disclosed herein does not necessarily have to be processed on a time-series basis in the order described in the example flowchart. A part or all of the processes in the vehicle exterior environment recognition procedure may involve parallel processing or processing based on subroutine.

The invention claimed is:

1. A vehicle exterior environment recognition apparatus configured to recognize an environment outside an own vehicle, the apparatus comprising:
    a road surface identifying unit configured to identify a road surface in an image;
    a three-dimensional object identifying unit configured to identify three-dimensional objects each having a height extending vertically upward from the identified road surface;
    a road surface determining unit configured to perform a determination of whether a three-dimensional-object-intervening region between the three-dimensional objects identified by the three-dimensional object identifying unit has a correspondence to the road surface, when the identified three-dimensional objects are separated from each other and are located at respective positions distant from the own vehicle by a same relative distance; and a three-dimensional object composition unit configured to regard the identified three-dimensional objects that are separated from each other as candidate parts of a unified three-dimensional object, when the three-dimensional-object-intervening region is determined to have no correspondence to the road surface by the road surface determining unit, wherein the road surface determining unit performs the determination of whether the three-dimensional-object-intervening region has the correspondence to the road surface based on blocks in the three-dimensional-object-intervening region located within a relative distance from the road surface.

2. The vehicle exterior environment recognition apparatus according to claim 1, wherein the three-dimensional object identifying unit determines determination values per block that includes a plurality of pixels, and performs integration of the determination values, on a block basis, along both or one of a vertical direction and a horizontal direction, the determination values indicating the correspondence to the road surface, and the road surface determining unit performs the determination of whether the three-dimensional-object-intervening region has the correspondence to the road surface, on a basis of an integrated value of the blocks in the three-dimensional-object-intervening region.

3. The vehicle exterior environment recognition apparatus according to claim 1, wherein the three-dimensional object identifying unit determines reliability values per block that includes a plurality of pixels, and performs integration of the reliability values, on the block basis, along both or one of a vertical direction and a horizontal direction, the reliability values each indicating a likelihood of the correspondence to the road surface, and the road surface determining unit performs the determination of whether the three-dimensional-object-intervening region has the correspondence to the road surface, on a basis of an integrated value of the blocks in the three-dimensional-object-intervening region.

4. A vehicle exterior environment recognition apparatus configured to recognize an environment outside an own vehicle, the apparatus comprising circuitry configured to identify a road surface in an image, identify three-dimensional objects each having a height extending vertically upward from the identified road surface, perform a determination of whether a three-dimensional-object-intervening region between the identified three-dimensional objects has a correspondence to the road surface, when the identified three-dimensional objects are separated from each other and are located at respective positions distant from the own vehicle by a same relative distance, and regard the identified three-dimensional objects that are separated from each other as candidate parts of a unified three-dimensional object, when the three-dimensional-object-intervening region is determined to have no correspondence to the road surface, wherein the determination of whether the three-dimensional-object-intervening region has the correspondence to the road surface is performed based on blocks in the three-dimensional-object-intervening region located within a relative distance from the road surface.

* * * * *